United States Patent Office 3,461,101
Patented Aug. 12, 1969

3,461,101
SPANDEX FIBERS HAVING SEGMENTS CONTAINING AT LEAST TWO TERTIARY NITROGEN ATOMS
Harald Oertel and Heinrich Rinke, Leverkusen, and Friedrich-Karl Rosendahl, Leverkusen-Schlebusch, Germany, assignors to Farbenfabriken Bayer Aktiengesellschaft, Leverkusen, Germany, a corporation of Germany
No Drawing. Filed May 21, 1965, Ser. No. 457,850
Claims priority, application Germany, May 23, 1964, F 42,968
Int. Cl. C08g 22/08, 22/04
U.S. Cl. 260—75                    1 Claim

ABSTRACT OF THE DISCLOSURE

Polyurethane elastomers and particularly fibers, are prepared by reacting an NCO-preadduct from a diisocyanate and an essentially linear polyhydroxy compound having terminal hydroxyl groups and a molecular weight of from about 500 to about 5000 with an organic nitrogen containing chain extender compound wherein the elastomer molecule contains a repeating unit having at least two tertiary nitrogen atoms of the formula

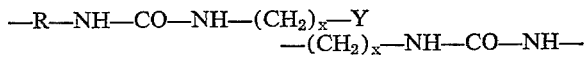
—(CH$_2$)$_x$—NH—CO—NH— where R is an aromatic bivalent radical, Y is a divalent radical containing two tertiary amino groups, $x$ is an integer of from 1 to 4, the tertiary nitrogen being present in an amount of from 20 to 100 milliequivalents per kg. of polyurethane elastomer.

---

This invention relates to certain novel polyurethane elastomers and to a process for the production of these polyurethane elastomers. Furthermore the invention relates to elastic filaments and foils prepared from said polyurethane elastomers.

The preparation of polyurethane elastomers by the diisocyanate polyaddition process from higher molecular weight, substantially linear polyhydroxy compounds, polyisocyanates and organic chain lengthening agents having reactive hydrogen atoms by reacting them in highly polar organic solvents is already known. In particular, these polyurethane elastomers prepared in highly polar organic solvents are formed into filaments and fibres which are used for many different purposes in the textile industry, especially in the corset and underwear industry for bathing wear, elastic garments or stockings, in some cases as core spun elastomer yarns spun round with filaments or staple yarns, and as staple fibre admixtures to non-elastic fibres for the purpose of improving the wearing properties of fabrics which are not in themselves highly elastic.

The elastic polyurethane filaments have numerous advantages over rubber threads; thus they are obtainable in practically any degree of fineness for textile purposes, they have higher tensile strengths and abrasion resistance and in many cases higher resilience, they are substantially resilient to cosmetic oils and solvents used in chemical cleaning processes and they have a high resistance to oxidation and ozone. In addition, in contrast to rubber threads, the polyurethane elastomer filaments can be dyed relatively easily with certain classes of dyes, e.g. dispersion dyes.

Owing to the special construction of the polyurethane elastomer filaments, which consists at least up to about 70% of amorphous constituents (constituents of the higher molecular weight polyhydroxy compounds), these elastomer filaments take up certain dyes (e.g. dispersion dyes) relatively easily but the dyes can very easily diffuse out again from the elastomer substance, e.g. when the elastomer substance is washed, which generally results in a very poor (wet) fastness of such dyeings. The same applies to dyeings with so-called acid dyes, chrome dyes or after-chroming dyes which also have insufficient fastness, in many cases accompanied by insufficient absorption rates and depths of the dyeings, which also has a negative effect on the fastness of such dyeings to abrasion. Further, the overdyeing properties are inadequate owing to the poor wash fastness of the dyeings. If the polyurethane elastomer fibres are to have a wide range of application in textile processes, the achievement of deep and fast dyeings is an essential prerequisite. This applies especially to the use of important groups of dyes such as acid dyes, metal complex dyes or chrome dyes with which e.g. polyamides, which are used preferentially in conjunction with elastic polyurethane filaments, can be dyed to deep and fast colours.

It is known that polyurethane elastomers on which better dyeings can be obtained can be prepared from preadducts having free NCO groups (from higher molecular weight polyethers or polyesters having terminal hydroxy groups and excess quantities of diisocyanates) and diamines of the type

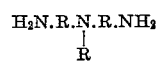

(R=C$_1$–C$_4$ alkyl or alkylene), preferably bis-(3-aminopropyl)-N-methylamine. In addition, elastomers are known which are obtained by reacting the preadducts with a mixture of the above diamines and hydrazine as chain lengthening agents in the molecular ratio of 20/80 to 50/50. By the partial incorporation of bis-(3-aminopropyl)-N-methylamine instead of hydrazine, although a good dyeability with acid dyestuffs is achieved, the mechanical and elastic properties deteriorate with increasing quantities of bis-(3-aminopropyl)-methylamine as chain lengthening agent. The softening points are considerably lower than in comparable products prepared with the usual diamines or hydrazine as chain lengthening agent. Although an elastomer obtained by reacting higher molecular weight, linear preadducts with bis-(3-aminopropyl)-methylamine as sole chain lengthening agent can be well dyed with acid dyes, it is soft and cannot be used for elastomer filaments because they would undergo severe shrinkage in the boiling dye bath.

An object of this invention, therefore, is to provide new polyurethane elastomers and filaments and foils thereof having a high elastic recovery, the dyeability of these polyurethane elastomers, especially those used for the production of highly elastic filaments or foils, being very markedly enhanced, especially with regard to their dyeability with acid dyes, metal complex dyes or after-chroming dyes which preferably contain acid groups in the dye. In the preparation of polyurethane elastomers by the diisocyanate polyaddition process from higher molecular weight, substantially linear polyhydroxy compounds, polyisocyanates and organic chain lengthening agents having reactive hydrogen atoms by reaction in highly polar organic solvent as chain lengthening agents, there are used primary, secondary or primary/secondary diamines which contain, in addition to the primary and/or secondary amino groups, also two or more tertiary amino groups in which all the carbon atoms that are directly attached to the tertiary nitrogen atom are aliphatic carbon atoms. In particular, these diamines containing two or more tertiary amino groups may also be included in addition to the known organic chain lengthening agents having reactive hydrogen atoms in quantities such that the finished polyurethane elastomer contains 20 to 1000 milliequivalents of tertiary nitrogen per kg. of elastomer substance. The quantity of diamine to be used according to the invention usually sufficient for increasing the dyeability is only e.g. about 5 to 15 mols percent of the total quantity of chain lengthening agents required for the reaction. The modification in the molecular structure thus achieved hardly makes itself felt at all in the mechanical or elastic properties and in the melting point of the elastomer substance. On the other hand, not only the dyeability but numerous other properties of the elastomers and properties of their solutions are greatly improved. These polyurethane elastomers having an essentially linear segmented structure consist of a reaction product of a NCO-adduct from a diisocyanate and an essentially linear polyhydroxy compound having terminal hydroxyl groups and a molecular weight from about 500 to about 5000 with an organic nitrogen-containing chain extender compound, said polyurethane elastomer containing a repeating unit having at least two tertiary nitrogen atoms; the repeating unit having the formula —R—NH—CO—NH—(CH$_2$)$_x$—Y
—(CH$_2$)$_x$—NH—CO—NH— wherein R is an aromatic bivalent radical, Y is a bivalent radical consisting of the piperazine radical, a lower alkyl-piperazine radical and a bivalent radical of the formula:

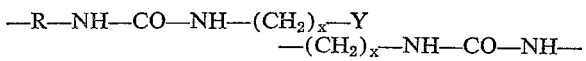

wherein $R_1$ is a lower alkyl group and $x$ is a whole number from 1 to 4. The repeating unit may be present in amount according to 20 to 1000 milliequivalents of tertiary nitrogen per kg. of the polyurethane elastomer.

Additionally to this repeating unit (a) the polyurethane elastomer may contain a repeating unit (b) of the formula

—R—NH—CO—NH—(Z)$_{0-1}$NH—CO—NH— wherein R has the same meaning as given above and Z is an alkylene, a cycloalkylene, a xylylene radical or the group —NH—CO—NH—. At least some of said units are connected by urethane linkages being attached to the linear polyhydroxy compound. In this case the repeating unit (a) is present in an amount according to 20 to 400 milliequivalents of tertiary nitrogen per kg. of the polyurethane elastomer. In the above formula R may be preferably diphenylmethane and $R_1$ methyl, ethyl, propyl and butyl.

Due to the modification in the molecular structure, the solubility behaviour is very favourably influenced in the direction of improved solubility and stability of the elastomer solutions. Thus highly viscous solutions of polyurethane elastomers obtained by the reaction of pre-adducts of higher molecular weight polyhydroxy compounds with excess quantities of diisocyanates and aliphatic diamines (ethylene diamine or m-xylylene diamine) in solvents such as dimethylformamide tend to be converted from an initially highly fluid state into a pasty non-fluid gel state which is obviously not due to a cross-linking reaction but probably due to a tendency to crystallisation. It is to be noted that by the slight modification by the process according to the invention, it is possible to obtain solutions which are considerably more stable and remain highly fluid for greater lengths of time. Such a modification is of very great advantage, especially when it is desired to build up very high melting polyurethane elastomers (M.P. above 250°) with chain lengthening agents such as aliphatic and aromatic diamines, especially ethylene diamine, 1:4-diaminocyclohexane, p-xylylenediamine, in which those chain segments that contain urea groups generally give rise to a severe reduction in solubility with the result that the solutions are unstable or immediately obtained in a pasty state in which they can not be shaped.

Polyurethane elastomers which have an approximately equivalent uptake of dye show a much less marked change in the properties of the elastomers when diamines containing several tertiary amino groups are used than elastomer substances modified for example by the known process with bis-(3-aminopropane)-methylamine. In addition, it is very advantageous that the polyurethane elastomers modified according to the invention show no tendency to the migration of additives in dyeing, a very disturbing phenomenon which can be observed in the known elastomers modified with added low molecular or even high molecular weight agents having tertiary amino groups.

By suitable choice of the proportions of modified diamines it is possible to obtain polyurethane filaments and fibres which readily permit a tone-in-tone dyeing with the yarns spun round the core or with other fabric components, so that these fibres have a wide field of application in textile processes open to them.

Furthermore, shaped articles such as filaments or foils formed from the polyurethane elastomers obtained according to the invention also manifest increased resistance to yellowing on prolonged standing in air or on exposure to the waste gases of combustion and on exposure to light and especially to UV radiation. Much lighter threads and foils are also obtained in spinning by the dry spinning process or casting of the elastomer solutions. This applies especially to the relatively easily discolouring polyurethane masses obtained by chain lengthening with aromatic diamines.

The tertiary amino groups incidentally also accelerate the reaction between the NCO groups and the reactive hydrogen atoms of the other components, in particular the reaction of the preadduct having free NCO groups with an organic chain lengthening agent having reactive hydrogen atoms. If these are aliphatic diamines or hydrazines then the catalytic acceleration is hardly of any importance but the situation is different if chain lengthening is effected with glycols. Surprisingly, the presence of these tertiary amino groups in the products of the process has practically no effect on the resistance to hydrolysis of the polyurethane elastomers.

It may be mentioned here that polyurethane elastomers which can be dyed well can also be obtained if by the process according to the invention the specifically characterised diamines are used as sole chain lengthening agents and the polyurethane elastomer obtained is added in amounts of about 5 to 20% to the usual elastomer substances which, as is known, cannot be dyed at all or at best only inadequately.

The diamines used as chain extending agents have the general formula

R′—NH—(CH$_2$)$_x$—Y—(CH$_2$)$_x$—NH—R′ wherein R′ is hydrogen or a lower alkyl group and Y a bivalent radical, the linking atoms of said bivalent radical being nitrogen.

The following are examples of diamines to be used according to the invention, which contain, in addition to the primary and/or secondary, preferably aliphatic amino groups, also two or more tertiary aliphatic amino groups; compounds of classes I and II are preferred:

(I) 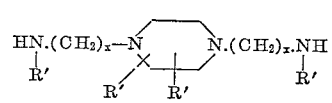

(II) 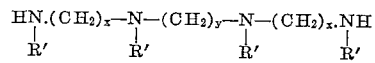

(III) 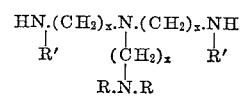

(IV) 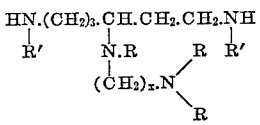

(V) 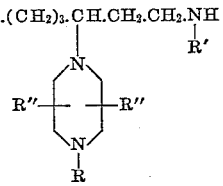

(VI) 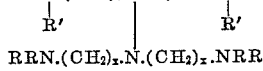

RRN.(CH₂)ₓ.N.(CH₂)ₓ.NRR (VII) 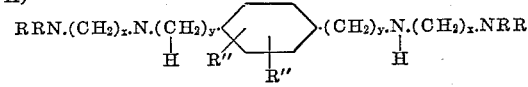

(VIII) 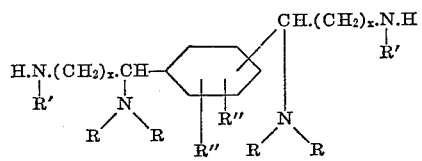

R=alkyl (e.g. methyl, ethyl, isopropyl, n-(iso)-butyl etc.
R'=H or R
R"=R' or inert substituents (e.g. halogen)
x=≧2, preferably 2–6
y=≧1, preferably 1–6

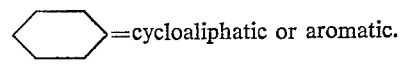=cycloaliphatic or aromatic.

The listing of these examples is not intended to denote any limitation to the said group of substances. For example, the chain length may be varied and instead of CH₂ groups, the compounds may contain —CHR— (R—=low alkyl) or —CRR groups. One or more —CH₂— chain members may be replaced by —O—. Replacement by —S— is in general not desirable since it has been found that this greatly increases the discolouration in light.

The following are specific examples of compounds which may be used:

piperazine-N:N'-bis(3-amino-propyl),
piperazine-N:N'-bis(2-amino-ethyl),
trans-2:5-dimethyl-piperazine-N:N'-bis(3'-amino-propyl),
piperazine-N:N'-bis(3-methylamino-propyl),
N:N'-dimethyl-N:N'-bis(3-amino-propyl)-ethylene-diamine,
N:N'-dibutyl-N:N'-bis(3-amino-propyl)-tetramethylene-diamine,
N:N'-diethyl-N:N'-bis(3-methylamino-propyl)-2-methyl-hexamethylenediamine,
hexamethylene-3-N:N'-methyl-piperazine-1:6-diamine,
hexamethylene-[3-N'-methyl-trans-2':5'-dimethyl-piperazine]-1:6-diamine,
hexamethylene-[3-amino-bis-(3'-dimethylamino-propane)]-1:6-diamine,
N:N-dimethyl-N':N'-bis(3'-aminopropyl)-propylene-1:3-diamine,
N:N-diethyl-N':-N'-bis(3'aminopropyl)-propylene-1:3-diamine,
m- (or p-)-N:N'-bis-(3'-dimethylaminopropyl)-xylylene-diamine,
m- (or p-)-N:N'-bis-(3'-dimethylaminopropyl)-hexa-hydroxylylenediamine,
1:3 (or 1:4)-phenylene-bis-(α-dimethylamino-β-amino-ethane).

The diamines to be used according to the invention must contain tertiary amino groups which carry aliphatic, cycloaliphatic or araliphatic substituents on the nitrogen since tertiary amino groups in which only one of the substituents is aromatic have no effect or only an inadequate effect in enhancing the dyeability. Suitable alkyl groups on the nitrogen atom are in particular lower alkyl groups (e.g. methyl to hexyl); these may also have branched carbon chains.

The chain length between the —NHR' groups through which incorporation into the polyurethane mass takes place should preferably not exceed 16 carbon atoms and is preferably less than 10 carbon atoms. In general, the shorter the chain length and the more compact the structure as well as the shorter the alkyl groups in the tertiary amino groups, the "harder" will be the elastomers obtained and the higher will be their melting point. The incorporation of cycloaliphatic or aromatic nuclei between the primary and/or secondary amino groups also leads to a "stiffening" of the molecular structure.

In general, those diamines are preferred which have as high a content of tertiary amino groups as possible, based on the molecular weight, since it is thus possible to achieve the greatest effect in increasing the dyeability without deteriorating the physical properties of the elastomer. Furthermore such diamines are preferred, which have the tertiary nitrogen in a side-chain, as these diamines show best dye-fastness.

The polyurethane elastomers can be built up by known methods, for example by reacting dichloroformic acid esters of higher molecular weight polyhydroxy compounds with diamines, hydrazine and if desired further reactive components such as dichloroformic acid esters of glycols or bis-acid chlorides.

For technical synthesis, it is generally preferred to employ the diisocyanate polyaddition process although the polyurethanes obtained by the polycondensation process from polychloroformic acid esters have practically the same properties for substantially the same structure as the elastomers obtainable by the diisocyanate polyaddition process.

For building up polyurethane elastomers by the diisocyanate polyaddition process, one may use substantially linear polyhydroxy compounds having substantially terminal hydroxy groups and a molecular weight of about 500 to 5000 and melting points preferably below about 60° C., e.g. polyesters of polycarboxylic acids and polyhydric alcohols, polyester amides, polyethers, polyacetals, poly-N-alkylurethanes and mixtures thereof; in addition, corresponding copolymers, e.g. with ester-ether-, acetal-, amide-, urethane-, N-alkylurethane- and urea groups may be used. The melting points of the higher molecular weight is below 60° C., preferably below 45° C.

Suitable higher molecular weight polyhydroxy compounds are listed, for example, in British patent specification 917,450, German patent specification 1,153,892, Belgian patent specification 643,167.

Particular mention is to be made of polyesters of adipic acid and if desired mixtures of dialcohols having preferably more than 5 carbon atoms since such polyesters have relatively good resistance to hydrolysis; and in addition, polyethers, preferably polytetramethylene ether diols, which may if desired be used as copolyethers, for example by incorporating a relatively small quanity of propylene oxide or ethylene oxide by polymerisation. Especially advantageous properties, particularly fastness to light, are achieved with those polyether derivatives, the OH end groups of which have been replaced by an —OCON(alkyl).CH₂(CH₂)ₓ.OH(x≧1) group (Belgian patent specification 652,742).

For the reaction with the higher molecular weight polyhydroxy compounds, diisocyanates such as those listed, for example in the above-mentioned patent specifications are used. Diphenylmethane-4:4'-diisocyanate, diphenyldimethylmethane-4:4'-diisocyanate, the isomeric toluylene diisocyanates as well as aliphatic diisocyanates such as hexane-1:6-diisocyanate and cyclohexane-1:6-diisocyanate have proved to be especially suitable.

The diisocyanates are reacted with the higher molecular weight polyhydroxy compounds in a OH/NCO-ratio of about 1:1.5 to 1:3, the reaction being carried out in the melt or in inert solvents such as dioxane, benzene, chlorobenzene or the like at temperatures of about 40 to 120°, preferably 70 to 100°, and reaction times being maintained such that a substantially linear preadduct with free NCO groups is obtained which on chain lengthening with approximately equivalent quantities of chain lengthening agents yield a substantially linear polymer which is still soluble in solvents such as dimethylformamide or dimethylsulphoxide. The viscosities of the elastomer solutions having a solids content of about 15 to 30% should be in the region of about 10 to 1500 poises/20° C.

A modification in the structure of the preadducts, which manifests itself after the chain lengthening reaction by the formation of elastomers of higher modulus and in some cases higher melting point and possibly slightly diminished elongation at break, can be achieved by using lower molecular weight (molecular weight below 250) diols such as ethylene glycol, butanediol, hydroquinone-bis-hydroxyethyl ether in addition to the higher molecular weight polyhydroxy compounds in the reaction with the diisocyanates (about 10 to 150% of the OH content of the higher molecular weight polyhydroxy compounds).

As organic chain extending agents which yield polymeric urethane elastomers by reaction with the preadducts it is preferred to use difunctional, relatively low molecular weight compounds (molecular weight below 750, preferably below 400, especially below 275) having reactive hydrogen atoms, for example glycols, diamines, hydrazines, polyhydrazide compounds, polycarboxylic acids and bis-(aminoxy)-α:ω-alkanes. Preferably compounds may be used containing the reactive hydrogen atoms bonded to the nitrogen atoms e.g.=diamines, hydrazine and carbohydrazide.

The following are mentioned as examples of such chain lengthening agents: Ethylene glycol, propane-1:2-diol, butane - 1:4 - diol, hexane-1:6-diol, 2(3)-methylhexane-1:6-diol, bis-hydroxyethylurea, terephthalic acid-bis-(β-hydroxyethylamide), hydroquinone - bis - hyrdoxyethyl-ether, naphthylene-1:5-bis-hydroxyethylether, oxalic acid, succinic acid, adipic acid, isophthalic acid, hydroquinone-bis - (n - aminopropyl-ether), ethylenediamine, 1,2-propylenediamine; 1,3 - propylenediamine, 1,4-tetramethylenediamine, hexamethylenediamine, 1:3- or 1:4-cyclohexanediamine, hexahydro-m-xylylenediamine, m-xylylenediamine, p - xylylenediamine, bis-(β-aminoethyloxalamide, piperazine, 2:5-dimethylpiperazine, ethanolamine, ω-amino-caproic acid, ω-hydroxy-butyric acid, 4:4-di-amino-diphenylmethane, 4:4'-diamino-diphenyl-dimethylmethane, ω-amino-acetic acid hydrazide, ω-amino-butyric acid hydrazide, ω-amino-caproic acid hydrazide, ω-hydroxy-acetic acid hydrazide, ω-hydroxy-butyric acid hydrazide, ω - hydroxy-caproic acid hydrazide, carbodihydrazide, hydroacrylic acid dihydrazide, adipic acid dihydrazide, isophthalic acid dihydrazide, m-xylylene-dicarboxylic acid dihydrazide, ethylene glycol-bis-carbazinic ester, butanediol-bis-carbazinic ester, ethylene-bis-semicarbazide, hexamethylene-bis-semicarbazide, hydrazine and hydrazine hydrate or N:N'-diamino-piperazine and diamino-hydroxy-1:2-ethane. Preferably the following compounds may be used as chain-extending agents: m-xylylene diamine, hydrazine and carbohydrazide and ethylene-diamine.

Compounds having more than 2 reactive hydrogen atoms may be added in very small quantities (at the most up to about 3 mols percent of chain lengthening agent) e.g. trimethylolpropane, tartaric acid, citric acid trihydrazide or aliphatic triamines.

Whereas the reactions of the preadducts with chain lengthening agents having hydroxyl groups and carboxyl groups (glycols, polycarboxylic acids) proceed relatively slowly, the chain lengthening agents which carry —NH$_2$— end groups in general react very rapidly with the NCO preadducts, for which reason it is preferred to work not with the free hydrazine or diamines but with the carbazinic acids or amino carbonates produced by addition of $CO_2$ or to employ a multi-stage process in which an excess of chain lengthening agent is at first used and the desired degree of polymerisation or desired viscosity of the solutions is adjusted subsequently in order to avoid the difficulties arising from the high reactivity of the chain lengthening agents.

The incorporation of the diamines having two or more tertiary amino groups, which are to be used according to the invention, into the polyurethane elastomer by reacting the preadduct with the chain lengthening agents can be carried out by known methods with many possible variations according to the types of starting materials and processes employed.

Thus when a preadduct is chain lengthened e.g. with aliphatic or cycloaliphatic diamines in solution, the preadduct can readily be reacted with the diamine or with diamine mixtures, for example a mixture of piperazine-N:N'-bis-(3-propylamine) and m-xylylenediamine in dimethylformamide solution, preferably in the form of their $CO_2$-adducts.

If the speeds of reaction between the diamines to be used according to the invention and the known chain lengthening agents which may even be used to a major extent, such as dihydrazides or diols, differ considerably from one another, then the structure of the molecule can be influenced by the manner and sequence of addition of the chain lengthening agents. If mixtures of the diamines to be used according to the invention and glycols are used as chain lengthening agents and this mixture is reacted with preadducts, then a chain lengthening reaction preferentially first takes place with the diamine part, followed by the reaction with the glycol part.

By controlled addition, e.g. by slow dropwise addition of the diamines containing several tertiary amino groups to the reaction mixture of preadducts and glycols or dihydrazides or similar chain lengthening agents, a statistically more uniform structure of the diamines can be achieved as the reaction progresses.

The elastomer solutions obtained may if desired be subjected to still further reaction; e.g. if free amine-, hydrazide- or similar end groups reactive to NCO groups are present, a reaction with di- or polyisocyanates may take place with increase in viscosity or a reaction with monoisocyanates or other "acylating" reactants such as pyrocarbonic acid diethyl ester may take place, the reactive end groups thus being converted into inactive end groups. Conversely, free isocyanate groups which have not yet reacted can be blocked by reaction with monofunctional compounds such as primary or secondary amines (e.g. dibutylamine) or alcohols, substituted hydrazines (e.g. N:N-dimethyl hydrazine), hydrazides or semicarbazides if it is desired to prevent any further reaction of the NCO end groups. Pigments, dyes, optical brightening agents, UV absorbents, special light protective agents, cross-linking agents or similar additives may be added to the elastomers.

Shaping of the elastomers is carried out mainly from their solutions. As solvents it is preferred to use organic solvents which contain amide, sulphoxide or sulphone groups and which have the capacity to undergo strong hydrogen bond linking, for example dimethylformamide, diethylformamide, dimethylacetamide, diisopropylpropionamide, formylmorpholine, hexamethylphosphoramide, tetramethylurea, dimethylsulphoxide tetramethylene sulphone. The boiling point of these solvents are below 250° C., preferably below 175° C.

For the production of elastomer filaments, the usual processes such as wet spinning and dry spinning processes are suitable. The spinning velocities in the dry spinning process are about 100 to 800 m./min., in the wet spinning process much lower (about 5 to 50 m./min.). Elastomer filaments are also produced by cutting elastomer foils of aout 0.10 to 0.20 mm. in thickness with a foil cutting machine. Elastomer foils or coatings can also be obtained on solid foundations or textile fabrics by application with brushes or doctor blades or may be applied by spraying techniques.

The properties of the filaments or foils are determined as follows:

TS=tensile strength (in g./den.) on a Wolpert instrument

Elg.=elongation (percent) (Wolpert instrument)

TS(B)=tensile strength (in g./den.) at breaking titre (converted)

The elastic properties are determined by the Elasto-Tensograph described in Chimia 16, 93–105 (1962).

The following properties are preferably determined:

M300=tension in mg./den. at 300% elongation of the filament at a stretching speed of 400%/min.

M150=tension at 150% elongation in the third release cycle after three times stretching to 300% at a rate of 400%/min.

Stress decay 300%/30''=percent tension drop at elongation of 300% (see above) within 30 seconds at 300% elongation.

Permanent elongation=percent permanent elongation after three extension cycles (in each case 300% maximum elongation, 400%/min. rate of elongation), 30 seconds after release of the thread.

The test in the Fade-O-Meter is carried out under normal test conditions.

Testing for fastness to waste gases is carried out by exposure to nitrous gases or by 90 minutes exposure to the waste gases of a Bunsen burner at 90°.

Dyeing is carried out by the standard procedures given below, preferably using the following dyes for comparison purposes:

(a) 2% of red dye of German Patent 230,594 (dying procedure A) and
(b) 10% of black after-chroming dye of German Patent 164,655 (dying procedure B).

The use of these dyes is not intended to imply any limitation. The dyes were used merely on account of their good response to any change in the dyeability of the elastomer material.

Dyeing procedure A.—Treat dyeing components, if desired with 1 to 2% of commercial equalising agents, with 1% acetic acid (60%) at 50°, heat to boiling and keep boiling for one hour while replenishing with 2% acetic acid (60%).

Dyeing procedure B.—(a) Bring dyeing components to the boil with 2% acetic acid (60%), dye at boiling temperature for one hour with addition of 4% formic acid (85%). (b) Bring the well washed dyeing to boiling with 3% potassium dichromate/5% formic acid and chrome at boiling point for 1 to 1½ hours.

The parts given in the examples are parts by weight unless otherwise indicated.

EXAMPLE 1

1200 parts of a polyester of adipic acid and hexanediol-1:6/2:2-dimethyl-propane-1:3-diol (molar ratio of glycols 65/35) (OH number of polyester 66.5, acid number 1.0) are heated with 298 parts of diphenylmethane-4:4'-diisocyanate and 374 parts of chlorobenzene for 50 minutes at 98 to 99° and then cooled to room temperature (NCO content of preadduct 2.12%).

About 20 parts of solid carbon dioxide are thrown into a solution of 2.04 parts of N:N'-piperazine-bis-($\gamma$-propylamine) (B.P. 124°/0.17 mm. Hg; $n_D^{20}$=1.5028) and 8.05 parts of 94% ethylene diamine in 1068 parts of dimethylformamide with vigorous stirring. 508 parts of the above preadduct solution are poured with vigorous stirring into the resulting suspension of carbamate, a homeogenous, clear, highly viscous solution (314 poises/20° C.) being obtained with evolution of $CO_2$.

After the addition of 10.5 parts of titanium dioxide and 0.33 part of hexane diisocyanate, the viscosity of the solution rises to 480 poises/20°. Even when left to stand for 5 hours, the solution still has good flow and can be spun by the dry spinning process to form elastomer threads.

Highly elastic foils are produced from the solution by painting the solution on to glass plates and drying for one hour at 100°, and these foils can be cut into filaments (of about 1000 den.) with a foil cutting machine.

Properties of the filaments, cut from foils: 0.64 g./den., 800% elongation, M300=mg./den., 14% permanent elongation.

Properties of the filaments obtained by the dry spinning process, depending on a preliminary stretching between draw-off roller and winding device, measured after one hour's fixation on spools at 130°:

P=0%, 0.58 g./den., 720% elongation, $M_{300}$=91 mg./den., permanent elongation 14%,
P=50, 0.82 g./den., 570% elongation, $M_{300}$=171 mg./den., permanent elongation 14%.

The melting point of the elastomer filaments is between 260 and 265° C. The calculated amount of tertiary amino groups in the elastomers is in the region of 45 mval./kg.

When dyed with 2% red dye of German Patent 230,594, intensely red orange coloured elastomer filaments are obtained and the wool sample in the exhaust test is practically colourless.

When dyed with 10% black after-chroming dyes of German Patent 164,655, deep black dyeings fast to abrasion and washing are obtained. Similar good results were obtained, when using equimolar amounts of N,N'dimethyl-bis-($\gamma$-aminopropyl)-ethylene diamine-1,2 as chain extending agent instead of N,N'-piperazino-bis-($\gamma$-propylamine).

Comparison test I 500 parts of a preadduct solution (NCO content 2.06%) prepared as in Example 1 are added with intensive stirring to a suspension prepared from 8.40 parts of 94% ethylene diamine in 1062 parts of dimethylformamide by throwing solid carbon dioxide into the reaction mixture. The viscous solution (135 poises/20°) is pigmented with titanium dioxide (rutile) to a content of 2.5% $TiO_2$ in the elastomer substance, and the viscosity of the elastomer solution is increased to 530 poises by the addition of 1.0 part of hexane-1:6-diisocyanate. After standing for a short time (12 hours) the solution is pasty and no longer flows. By heating for several hours at 65°, the solution can be temporarily converted into a fluid state and spun by the dry spinning process through a spinneret preheated to 65 to 75°. After cooling, the solution solidifies again to a pasty gel.

The melting point (Kofler block) of the threads is in the region of about 265° C.

When the substance is dyed with 2% red dye of German Patent 230,594 (dyeing process A) and 10% black dye of German Patent 164,655 respectively, the elastomer filaments are only tinged a rather feeble orange or grey colour.

Comparison test II

About 15 parts of solid carbon dioxide are thrown into a solution of 1.15 parts of bis-($\gamma$-aminopropyl)-methylamine and 6.22 parts of 94% ethylenediamine in 853 g. of dimethylformamide. 400 parts of the preadduct solution of Example 1 are slowly stirred into the resulting suspension of carbonic acid salts. The solution is pigmented by the addition of 25 parts of 33% titanium dioxide paste, and the viscosity of the solution is increased from 100 poises to 450 poises by introducing 0.9 part of hexamethylene-1:6-diisocyanate. The solution can be spun by the dry spinning process to form elastomer threads.

The melting point (Kofler block) of the elastomers is in the region of 250°, the filaments become very friable above 230°.

When dyed with 2% red dye of German Patent 230,594, only moderate dyeing is observed, and a wool sample used for the exhaust test in the dyebath which is not nearly exhausted is much more deeply coloured than the elastomer fibre.

The dyeability with 7.5 mols percent of bis-(aminopropyl)-methylamine as modifying chain lengthening agent is thus not sufficient and is much less than in the example according to the process of the invention. Elastomer filaments (cut from foils) have the following properties: TS=0.67 g./den., elongation 800%, modulus 300%, 87 mg./den., 18% permanent elongation.

Comparison test III

About 10 parts of solid carbon dioxide followed by 200 parts of the preadduct solution of Example 1 (NCO content 2.12%) are introduced into a solution of 1.18 parts of N-methyl-bis-(γ-propylamine)-amine and 2.92 parts of 94% ethylene diamine in 426 parts of dimethylformamide, a viscous solution (400 poises/20° C.) being obtained with evolution of $CO_2$.

The solution is cast to form elastomer foils and these foils are cut up into filaments.

The melting point (Kofler block) of the elastomer substance is in the region of about 235 to 255°, the softening range of the elastomer substance begins already at temperatures above 200° C. Elastomer filaments (cut) have the following properties: TS=0.65 g./den., 805% elongation, modulus 300%, 77 mg./den., 22% permanent elongation.

The modulus of the filaments is less than that of unmodified filaments or filaments modified according to the invention, the permanent elongation is markedly higher and the melting point greatly lowered.

When dyed with 2% red dyes of German Patent 230,594, well dyed filaments are obtained and the dye in the dyebath is not quite quantitatively exhausted.

Comparison test IV 600 g. of the polyester described in Example 1 are heated with 149 g. of diphenylmethane-4:4'-diisocyanate and 187 g. of chlorobenzene for 50 minutes at 97 to 99° C. After cooling, the preadduct has an NCO content of 2.04%.

About 15 g. of solid carbon dioxide are introduced into a solution of 3.72 g. of γ:γ'-di-(aminopropyl)-methylamine in 218 g. of dimethylformamide and the mixture stirred, and 100 g. of the above adduct solution is then introduced with vigorous stirring into the suspension of the carbamate. A homogeneous viscous solution (380 poises/20° C.) is obtained with evolution of $CO_2$, and pigmented by addition of 6.5 g. of a paste containing 33% titanium dioxide.

After pouring the solution on to glass plates and drying at 100°, colourless films of low tensile strength are obtained:

M300% (mg./den.) _____ 19
M150% (mg./den.) _____ 6
Permanent elongation (percent) _____ 300

These values are extraordinarily poor. Such threads are practically useless. The elastomer substance softens above 110° and melts at about 180 to 195° C.

When dyed with acid dyes, a deep dyeing is obtained, and severe shrinkage of the elastomer substance occurs at boiling temperature.

EXAMPLE 2

A solution of 5.45 parts of piperazine-N:N'-bis-(γ-propylamine) in 223 parts of dimethylformamide is converted into a suspension of aminocarbonates by throwing solid carbon dioxide into the solution, and the suspension is then treated with 107.5 parts of the adduct solution from Example 1 with vigorous stirring. A highly viscous clear solution of 390 poises/20° C. is obtained which still flows smoothly even after standing for several weeks. Foils are produced from the solution by pouring it onto glass plates and drying at 100°, and the foils are cut up into threads. The threads are of moderate strength.

The elastomer substance is soluble in some acids e.g. formic acid, in contrast to elastomers lengthened with ethylene diamine as chain lengthening agent.

The melting point (Kofler block) of the elastomer substance is in the region of 212° C. (liquid). Above 185° C., the polymer is soft and can be spread.

When the substance is dyed with red dye (2%) of German Patent 230,594 (dyeing procedure A), the dyebath is exhausted quantitatively and a deep red dyeing is obtained on the elastomer. However, the elastomer threads shrink in the boiling dyebath. Dyeing with 10% black dye of German Patent 164,655 (dyeing procedure B) produces a deep black dyeing.

EXAMPLE 3

1200 parts of the polyester from Example 1 are heated with 334 parts of diphenylmethane-4:4'-diisocyanate and 384 parts of chlorobenzene for 50 minutes at 90 to 98° and then cooled to room temperature (NCO content=2.54%).

A solution of 410 parts of piperazine-N:N'-bis(γ-propylamine) and 19.3 parts of m-xylylene diamine in 1165 parts of dimethylformamide is converted into a suspension of the damine carbaminates by throwing solid carbon dioxide into the solution. By slowly introducing 475 parts of the above preadduct solution, a highly viscous homogeneous polymer solution is produced which is pigmented by addition of 24 g. of a 33.3% titanium dioxide/dimethylformamide past. Viscosity 527 poises/20° C.

The solution is spun by the dry spinning process through spinnerets of 16 apertures of 0.2 mm. diameter into a spinning shaft of 5 m. in length heated to 220°, and the filaments are drawn off at the rate of 100 m./min. and after being dressed with talcum they are wound on rollers at the rate of 102 m./min. After heating the elastomer filaments on spools for one hour, the filaments have the following properties: 192 den., 074 g./den., 665% elongation, 5.63 g./den. (breaking titre), M300=90 mg./den., M150=19 mg./den., stress decay=35%, permanent elongation=12%.

Films cast from the elastomer solution have the following properties when they have been cut up into elastomer filaments: Titre 854 den., TS 0.59 g./den., elongation 608%, M300=86 mg./den., M150=21 mg./den., stress decay=32%, permanent elongation=14%.

When the filaments are dyed with 2% red dye of German Patent 230,594, a quantitative uptake of the dye on the fibre is observed.

Dyeing with (10%) black after-chroming dye of German Patent 164,655 gives rise to deep black elastomer filaments dyed fast to abrasion and washing. The melting point of the elastomer filaments is in the region of 240° C.

Comparison test V

A solution of 20.55 parts of m-xylylenediamine in 1165 parts of dimethylformamide is converted into a suspension of the carbonic acid salts by the addition of $CO_2$, and 500 parts of the preadduct from Example 3 are slowly added to this suspension with stirring. A clear, highyl viscous solution of about 900 poises/20° C. is obtained. When left to stand, the solution shows a tendency to solidify to a pasty mass, this process being reversible only by heating. 1300 parts of this elastometer solution are pigmented with 24 parts of a 33.3% titanium pigment paste, and the elastomer solution is spun by the dry spinning process to form elastic filaments (conditions as in Example 3). 186 den., 0.75 g./den., 655% elongation, 5.75 g./den. (breaking titre), M300=80 mg./den., M150=15 mg./den., stress decay 300%/30″=38%, permanent elongation=15%.

Foils cast from the elastomer solution are cut into filaments and these have the following properties: 1037 den. 0.53 g./den., 640% elongation, 3.94 g./den. (breaking titre), M300=80 mg./den., M150=18 mg./den. stress decay 300%/30″=38%, permanent elongation=20%.

The melting point of the elastomer substance is in the region of 250° C.

When dyed with 2% red dye of German Patent 230,594, the elastomer filaments are only weakly coloured and the wool sample in the exhaust test is coloured deep red. When dyed with black dye, only a grey dyeing is obtained.

EXAMPLE 4

400 parts of the preadduct solution from Example 1 and a solution of 1.94 parts of N:N-diethyl-N':N'-bis (γ-propylamino)-propylene diamine-1,3 in 161 parts of dimethylformamide are added simultaneously from two dropping funnels into a 70° hot solution of 8.85 parts of carbodihydrazide in 700 parts of dimethylformamide, the reaction mixture being stirred at the same time. The resulting viscous (55 poises/20° C.) elastomer solution is pigmented to 2.5% (based on the solids content) with rutile and brought to a viscosity of 290 poises/20° C. by the addition of 1 part of hexanediisocyanae. Elastomer foils are produced from the solution and cut up into filaments.

Properties:

| | |
|---|---|
| Tensile strength | 0.66 g./den. |
| Elongation | 780%. |
| Modulus | 300%, 90 mg./den. |
| Permanent elongation | 14%. |

On exposure in the Fade-O-Meter, no discoloration occurs in the filaments up to 20 hours of exposure whereas comparable elastomer filaments without modification by the said diamines are discoloured yellow by that time.

The melting point (Kofler block) is in the region of 230° C. (that of the filaments without the above mentioned diamine is in the region of about 230 to 235° C.).

Dyeing with 2% red dye of German Patent 230,594 or with black after-chroming dye (10%) of German Patent 164,655 leads to deeply coloured elastomer filaments which are fast to washing and abrasion. When dyeing with a yellow dye of dyeing procedure B, colour changes from yellow to dirty yellow to brown are observed in the chrome bath. Such colour changes are prevented by the addition of small quantities of reducing agents (e.g. sodium dithionite, sodium hydrogen sulphite, hydrazine, carbodihydrazide) to the chrome bath.

The dimaine used is prepared as follows: 650 parts of N:N-diethylamino-propane-1:3-diamine are treated with 530 parts of acrylonitrile and heated to 80° for 3 hours. On distillation, the N:N-diethylamino-N':N'-bis-(β-cyano-ethyl)-propanediamine distils over at 165 to 170°/0.22 mg. ($n_D^{20}$ 1.4580). 312 parts of the dinitrile mixed with 600 parts of methanol, 200 parts of liquid ammonia and 50 parts of Raney cobalt are reduced to the diamine by heating for 2 hours with hydrogen at 95° C./150 atmospheres above atmospheric pressure. B.P. 153–154.5/0.4 mm. Hg, $n_D^{20}$ 1.4717.

EXAMPLE 5

100 parts of an adduct solution of Example 1 are introduced with stirring into a solution of 0.525 part of the above diamine and 136 parts of 97% hydrazine hydrate in 212 parts of dimethylformamide, and the solution (about 90 poises) is pigmented with 2.5% $TiO_2$. The solution flows smoothly even after prolonged standing.

The solution is cast to form foils (one hour/100° drying time) and these foils are cut into filaments.

Dyeing with red or black acid dyes produces deep and fast dyeings.

On exposure in the Fade-O-Meter, the elastomer foils show greater resistance to discoloration than comparable foils prepared with hydrazine as the sole chain lengthening agent.

EXAMPLE 6

240 parts of a preadduct solution (obtained from 600 parts of polyester from Example 1 and 272 parts of diphenylmethane-4:4'-diisocyanate in 218 parts of chlorobenzene, NCO content 5.60%) are diluted with 300 parts of dimethylformamide solution, and a solution of 3.24 parts of piperazine-N:N'-bis-(γ-propylamine) and 28 parts of p-phenylenedihydroxyethyl ether in 300 parts of dimethylformamide are slowly added with stirring within 5 minutes. By the end of about 8 hours, a viscous elastomer solution (100 poises/20°) has been produced which is cast to form elastomer foils of about 0.20 mm. in thickness. Filaments obtained from the elastic foils by cutting are dyed with the red dye of German Patent 230,594 (2%) (dyeing procedure A) or with the black after-chroming dye of German Patent 164,655 (10%) (dyeing procedure B). In dyeing procedure A, a deep red elastomer filament is produced and the dyebath is free from dye. The deep black dyeing obtained according to procedure B is abrasion resistant and very fast to washing.

On exposure of the foils to light, the foils are found to be relatively stable to discolouration (almost colourless up to 50 Fade-O-Meter hours).

EXAMPLE 7

600 parts of the polyester from Example 1 are heated with 158 parts of diphenylmethane-4:4'-diisocyanate and 189 parts of chlorobenzene for 50 minutes at 95 to 100°. After cooling to room temperature, the NCO content of this preadduct is 2.34%.

205 parts of the above preadduct solution are stirred into a solution of 1.115 parts of piperazine-N:N'-bis-(propylamine) and 9.95 parts of diphenylmethane-4:4'-diamine in 324 parts of dimethylformamide. A colourless elastomer solution of 258 poises/20° is obtained. Further increase in viscosity is stopped by the addition of 10 ml. of a 0.5 N dimethylhydrazine solution in chlorobenzene.

The elastomer solution is cast to form foils (100° drying temperature) and these are cut into filaments. These threads show a practically quantitative uptake of dye when dyed with 2% red dye of German Patent 230,594 and a deep black dyeing with black after-chroming dye of German Patent 164,655.

The foils show much better stability to discoloration in the Fade-O-Meter than foils produced without the addition of the said diamines. Whereas foils without the modification according to the invention are discoloured brown yellow after only 20 Fade-O-Meter hours, the foils presented here show only a slight discolouration up to 50 hours exposure.

Comparison test VI

A solution of 26.8 parts of 4:4'-diamino-diphenylmethane in 930 parts of dimethylformamide is reacted, with stirring, with 485 parts of the preadduct solution of Example 7, a viscosity of 628 poises/20° C. being reached after one hour. When cast to form foils (100°/60 minutes drying temperature), foils discoloured a deep yellow brown are obtained. When cut into filaments and dyed as in Example 7, they show only a very slight uptake of dye.

EXAMPLE 8

1200 parts of the polymer from Example 1 are heated with 335 parts of diphenylmethane-4:4'-diisocyanate and 384 parts of chlorobenzene for 50 minutes at 90 to 98°

C. NCO content of the peadduct after cooling: 2.68%.

About 10 parts of solid carbon dioxide are thrown into a solution of 4.60 parts of piperazine-bis-propylamine and 17.9 parts of p-xylylene diamine in 1060 parts of dimethylformamide, and 420 parts of the preadduct solution is added to the suspension and stirred. A highly viscous, well flowing elastomer solution is obtained which can be cast to form foils or spun by the wet or dry spinning process to form highly elastic filaments.

When dyed with the dyes described above, deep red or deep black dyeings are otbained which are fast to abrasion and washing.

When it is attempted to react the preadduct by the process described above with 100 mols percent of p-xylylene diamine in dimethylformamide solution, a pasty and then crumbly mass is obtained even before the calculated quantity of NCO preadduct has been added, and this mass can only be converted temporarily into a viscous solution by prolonged heating at 80 to 100° and immediately reverts to a non-fluid state when cooled.

EXAMPLE 9

100 parts of an elastomer solution prepared as in Example 2 with piperazine-N:N'-bis-($\gamma$-propylamine) as chain lengthening agent are mixed with 900 parts of an elastomer solution which has been prepared from the same NCO preadduct but chain lengthened with carbodihydrazide (20.2 parts of carbodihydrazide in 1840 parts of dimethylformamide are reacted with 870 parts of NCO preadduct solution and treated with 16 parts of titanium dioxide).

The mixture of elastomer solutions is spun by the dry spinning process to form elastomer filaments which have very good dyeability with the above described red and black dyes. The melting point of the filaments is in the region of 220° C.

EXAMPLE 10

600 parts of a poly-(tetramethyleneoxide)-polyether having $OCON(CH_3).CH_2.CH_2.OH$ end groups (OH number 60), prepared from polyetetrahydrofuran, phosgene and N-methylethanolamine by a process described in United States Patent No. 3,365,412, are dewatered for one hour at 130°/12 mm. Hg after the addition of 1.2 ml. of a 35% $SO_2$ solution in dioxane, and the resulting substance is heated with 136.5 parts of diphenylmethane-4:4'-diisocyanate and 316 parts of chlorobenzene for 2 hours at 98° (NCO content after cooling=1.91%).

From a solution of 5.0 parts of ethylene diamine and 2.94 parts of piperazine-N:N'-bis-propylamine in 745 parts of dimethylacetamide, a suspension of the amino carbonates is prepared by throwing excess solid carbon dioxide into the solution, and 420 parts of the above NCO preadduct are vigorously stirred into the suspension. $CO_2$ is evolved and a clear, homogeneous elastomer solution is produced which is pigmented by the addition of 21.8 g. of $TiO_2$ paste (33%). The viscosity of the solution rises from 165 to 510 poises by the addition of 0.2 part of hexanediisocyanate.

By the dry spinning process there are obtained elastomer filaments which either without preliminary stretching or with a preliminary stretching of 100% are fixed on spools for one hour at 130° in a vacuum drying cupboard and are then found to have the following properties:

| P | Titre (den.) | TS (g./den.) | Elg. (percent) | M 300 (mg./den.) | M 150 (mg./den.) | Tension drop (percent) | Permanent elg. (percent) |
|---|---|---|---|---|---|---|---|
| 0 | 220 | 0.60 | 775 | 110 | 19 | 26 | 18 |
| 100 | 125 | 0.95 | 530 | 300 | 24 | 40 | 16 |

Excellent dyeings can be obtained on these filaments with acid dyes.

On exposure in the Fade-O-Meter, the filaments show a very much better stability to discolouration and mechanical deterioration than comparable filaments produced without the incorporation according to the invention of diamines containing tertiary N-atoms.

EXAMPLE 11

1200 parts of the polyester from Example 1 are heated with 328 parts of diphenylmethane-4,4'-diisocyanate and 382 parts of chlorobenzene for 50 minutes at 96° C. NCO-content of the NCO-prepolymer after cooling=2.47%.

In everyone of the following experiments $\alpha$, $\beta$, $\gamma$ 415 parts of NCO-prepolymer are added with stirring to solutions of carbohydrazide and diamine (parts are given in the table) in 935 g. dimethylformamide (temperature 50° C.).

| | Parts | | Milli-equivalents of tertiary nitrogen per kg. of solid elastomer | Viscosity of the elastomer solution (Poise /20° C.) |
|---|---|---|---|---|
| Exp. | Carbohydrazide | Diamine[1] | | |
| $\alpha$ | 10.28 | 3.03 | 75 | 505 |
| $\beta$ | 9.15 | 6.06 | 150 | 550 |
| $\gamma$ | 7.60 | 10.2 | 250 | 700 |

[1] Diamine=
$$H_2N.CH_2.CH_2.CH_2$$
$$\phantom{H_2N.CH_2.CH_2.}\diagdown$$
$$\phantom{H_2N.CH_2.CH_2.CH_2}N.CH_2.CH_2.CH_2.N(C_2H_5)_2$$
$$\phantom{H_2N.CH_2.CH_2.}\diagup$$
$$H_2N.CH_2.CH_2.CH_2$$

To every elastomer-solution are added 25 parts of a pigment/dimethyl-formamide-mixture, containing 33% titanium-dioxide. With the addition of 0.65 part of 1,6-hexane-diisocyanate the viscosity of the elastomer-solution grows to such an amount (505–700 poise/20° C.) that the elastomer-solutions $\alpha$, $\beta$, and $\gamma$ can be dry-spun to elastomer-filaments (a, b, c) in well known manner.

The elastomer-filaments (a–c) are dyed in conventional manner with 2% of C.I. Acid Blue 220. In all cases the dye-bath was completely exhausted.

These dyed filaments are rinsed with hot, distilled water to ensure complete removal of dye and acid from the dyebath. They are then boiled for 10 minutes in distilled water. After removal of the elastomer-filaments the boiled off-dye in the liquid is dyed onto an equal amount (with regard to the weight of the elastomer-filaments) of wool. For comparison elastomer-filaments, which were prepared as described above, but only with carbohydrazide as chain-extending-agent, and which contained 5% by weight of polymeric $\beta$-diethylaminoethylmethacrylate were dyed, and after-treated as described above. From the following table it can be seen, that the wash-fastness of the dyeings are much better for the filaments (a–c) than for the filaments, containing 5% polymeric $\beta$-diethylamino-ethyl-methacrylate.

TABLE

| Filament | Milli-equivalents of tertiary N per kg. elastomer | 2% C.I. Acid Blue 220 | Loss of dye from the dyed fibers at 10 minutes boiling | Color of the wool |
|---|---|---|---|---|
| (a) | 75 | Dye-bath completely exhausted. | Weak | Weak blue. |
| (b) | 150 | | Very weak | Very weak blue. |
| (c) | 250 | | None | Colorless. |
| comparison | ca. 275 | Dye-bath contains. | Very strong | Deep blue. |

(With 5% poly-$\beta$-diethylamino-ethyl-methacrylate)

The elastomer-filament (c) was dyed with—

2% C.I. Acid red 23635
2% C.I. Acid blue 220 and
12% black dye after DRP 164655 after-treated with Na$_2$Cr$_2$O$_7$.

The dyed filaments were examined for fastness against perspiration after DIN 54020/I and II and showed the following results (see table).

TABLE

| Dye | (Alkaline) (DIN 54020/I) | Acid (DIN 54020/II) |
|---|---|---|
| 2% C.I. Acid red 23635 | 4–5 P | 4–5 P |
| red 23635 | 4–5 R | 4–5 R |
| 2% C.I. Acid | 4–5 P | 4–5 P |
| blue 220 | 4–5 R | 4–5 R |
| 12% black dye | 4 P | 4 P |
| (see DRP 164655), after treated with Na$_2$C$_2$O$_7$. | 4 R | 4 R |

P=bleeding on polyamid, R=bleeding on rayon.

What we claim is:
1. A polyurethane elastomer having an essentially linear segmented structure, consisting of the reaction product of an NCO-preadduct from a diisocyanate and an essentially linear polyhydroxy compound selected from the group consisting of polyesters and polyethers and having terminal hydroxyl groups and a molecular weight from about 500 to about 5,000 with an organic nitrogen-containing chain extender compound, said polyurethane elastomer containing a repeating unit having at least two tertiary nitrogen atoms of the formula:

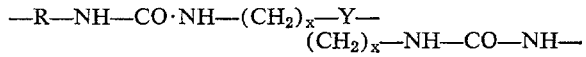

wherein R is an aromatic bivalent radical and Y is a bivalent radical of the formula:

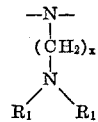

wherein R$_1$ is a lower alkyl group and $x$ is an integer from 1 to 4; at least some of said units being connected by urethane linkages attached to the NCO-preadduct residue said repeating unit being present in an amount according to 20 to 1,000 milliequivalents of tertiary nitrogen per kg. of said polyurethane elastomer.

References Cited

UNITED STATES PATENTS

| | | | |
|---|---|---|---|
| 2,929,803 | 3/1960 | Frazer et al. | 260—77.5 |
| 3,040,003 | 6/1962 | Beaman | 260—77.5 |
| 3,136,830 | 6/1964 | Oertel et al. | 260—77.5 |
| 3,180,853 | 4/1965 | Peters | 260—77.5 |
| 3,305,533 | 2/1967 | Thoma et al. | 260—75 |

DONALD E. CZAJA, Primary Examiner

H. S. COCKERAM, Assistant Examiner

U.S. Cl. X.R.

260—77